P. V. TOWNSEND.
TOOL HOLDER FOR LATHES.
APPLICATION FILED AUG. 17, 1921.

1,418,992. Patented June 6, 1922.

Inventor
PAUL V. TOWNSEND,
By H L Woodward
Attorney

UNITED STATES PATENT OFFICE.

PAUL V. TOWNSEND, OF ANDERSON, INDIANA.

TOOL HOLDER FOR LATHES.

1,418,992.  Specification of Letters Patent.  Patented June 6, 1922.

Application filed August 17, 1921. Serial No. 493,009.

*To all whom it may concern:*

Be it known that I, PAUL V. TOWNSEND, a citizen of the United States, residing at Anderson, in the county of Madison and State of Indiana, have invented certain new and useful Improvements in Tool Holders for Lathes, of which the following is a specification.

This invention has for an object to enable the quick adjustment of a tool in a tool holder. It is an important aim to provide a device of this character which will be able to properly grip and hold a tool when the latter has been worn down until very short. It is a further important aim to enable the use of a tool formed by merely grinding obliquely the end of an ordinary stock bar of suitable form in cross section.

Figure 1:
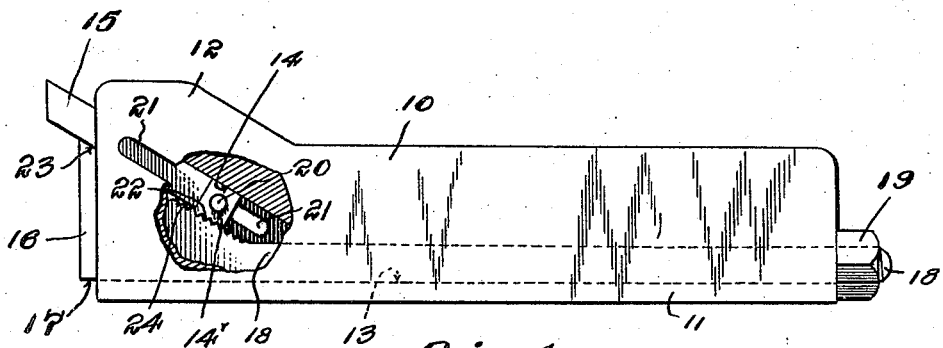
Figures 2, 4:
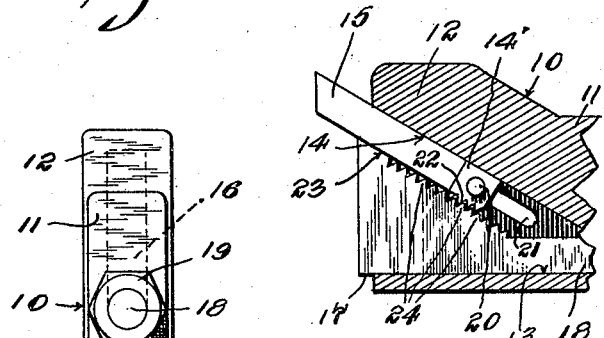
Figure 3:
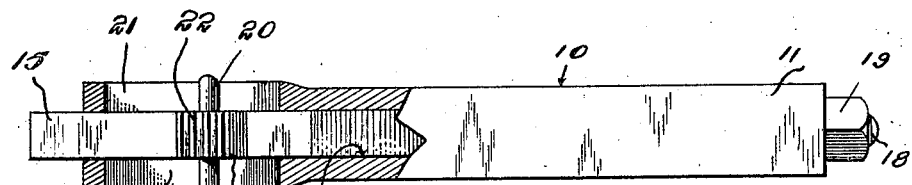

Additional objects, advantages and features of invention will appear from the construction, arrangement and combination of parts hereinafter described and shown in the drawings, wherein, Figure 1 is a side elevation of my holder and tool, with a part broken away, Fig. 2 is a rear end view thereof, Fig. 3 is a bottom view with parts broken away to show the adjusting block and tool in the holder, Fig. 4 is a fragmentary sectional view showing the construction of the clamping bar, adjusting block and holder, in detail.

There is illustrated a holder 10 comprising a shank portion 11 of a suitable size and form to be engaged in an ordinary tool post, and slightly enlarged at its inner or work holding end, at the sides and upon the upper part, its lower face being rectilinear, however, throughout its length. The enlargement of the holder forms a head 12, as illustrated. Formed through the shank 11 there is a passage 13 rectangular in form which, within the head 12, is increased in dimension toward the upper side so as to form an inclined tool receiving face 14. The opening being extended through the adjacent end face of the holder, and forming a tool receiving channel in which a tool 15 may be adjusted at a suitable inclination so as to rest against the face 14, snugly. A tool clamp 16 is slidable in the opening, having a lower face 17 adapted to rest snugly upon the lower side of the passage 13, while the upper side is inclined so as to snugly engage the lower side of the tool 15 and clamp it against the surface 14 at the upper side of the passage, within the head 12. The clamp 16 is provided with a shank 18, which is threaded at its extremity and engaged by a nut 19 by which the clamp 16 may be drawn inwardly against the tool, as will be understood, the nut being screwed against the end face of the shank 11.

Slidable in the passage 13 within the head 12, between the clamp 16 and face 14 there is a butt block 14' before mentioned, formed with pins or arms 20, projected laterally through slots 21 formed in the sides of the head 12 in parallel relation to the surface 14. The lower side of the block 14' is provided with a series of teeth 22, the bases of which are set in the block 14' in a plane slightly above the lower surface of the tool 15, and the upper inclined face 23 of the clamp 16 is formed with a series of corresponding teeth 24, adapted to mesh with those of the block 14', but having their apices disposed in a plane alined with the planiform inclined face 23 of the clamp at the outer part, the series of teeth extending from immediately adjacent the shank 18 for a proper distance outwardly on the inclined part to permit of the necessary adjustment of the block 14 to accommodate such lengths of tools as may be properly used with the holder.

In the use of the device, the holder 10 may be permanently secured in the tool post, or retained therein with any customary means. In order to place a tool within the device, the nut 19 is loosened and the clamp pressed inwardly until the block 14 is free to be moved reciprocably, when the pins 20 may be grasped between the thumb and forefinger of the hand of the operator and the block 14 adjusted at the proper position to support a tool with its point projected a desired distance from the holder, after which the tool is introduced over the clamp 16 and allowed to slide inwardly until its butt end rests against the block 14. The latch 19 is then tightened until the tool is properly clamped, the teeth 22 engaging those 24 of the clamp so as to give proper support to the tool and prevent it from being pushed inwardly into the holder while yet not preventing the clamp from coming into proper contact with the tool, owing to the fact that the kerf between the teeth 22 are sufficiently deep to permit the teeth 24 to lie only partly therein when the tool is clamped.

What is claimed:

1. A tool holder comprising a body having a longitudinal passage therethrough enlarged at one end to form an inclined tool supporting face, a clamping device reciprocable therein and having a face opposed to that first mentioned, means to draw the clamping device inwardly within the holder for clamping of the tool between said faces, a series of teeth being formed upon said clamp opposed to said first named face, and a toothed block slidable in the holder for clamping therein at the butt end of the tool as described.

2. A holder comprising a body portion having a longitudinal passage therethrough enlarged at the inner end to form an inclined tool rest face, a clamping device reciprocable therein having a face opposed to the rest face, means to draw the clamp inwardly, teeth formed on said inclined face of the clamping device, a slidable toothed block between the rest face and the opposed face of the clamp, slots at the sides of the holder parallel with said rest face, and pins on said block projected through the slot for the purposes described.

In testimony whereof I have affixed my signature in presence of two witnesses.

PAUL V. TOWNSEND.

Witnesses:
ROBERT R. RICKERT,
ARTHUR D. SUMMERS.